United States Patent
Li

(10) Patent No.: US 12,429,335 B2
(45) Date of Patent: Sep. 30, 2025

(54) PERSONAL NAVIGATION DEVICE OPERABLE IN GNSS-DENIED ENVIRONMENT

(71) Applicant: The Boeing Company, Chicago, IL (US)

(72) Inventor: Rongsheng Li, Corona, CA (US)

(73) Assignee: The Boeing Company, Arlington, VA (US)

(*) Notice: Subject to any disclaimer, the term of this patent is extended or adjusted under 35 U.S.C. 154(b) by 986 days.

(21) Appl. No.: 17/478,942

(22) Filed: Sep. 19, 2021

(65) Prior Publication Data

US 2024/0401953 A1    Dec. 5, 2024

Related U.S. Application Data

(60) Provisional application No. 63/120,659, filed on Dec. 2, 2020.

(51) Int. Cl.
G01C 21/02        (2006.01)

(52) U.S. Cl.
CPC .................................. G01C 21/025 (2013.01)

(58) Field of Classification Search
CPC .................................................... G01C 21/025
(Continued)

(56) References Cited

U.S. PATENT DOCUMENTS 6,407,699 B1 *  6/2002  Yang .................... G01S 19/21
                                                        342/357.65
6,470,270 B1   10/2002  Needelman et al.
(Continued)

FOREIGN PATENT DOCUMENTS

CN   106405595 A      2/2017
CN   110906926 B  *  4/2023  ............. G01C 21/02
(Continued)

OTHER PUBLICATIONS

Miller, M, Thao Nguyen, andChunYang. "SymmetricPhase-OnlyMatchedFilter(SPOMF)forFrequency-DomainSoftwareGNSS Receivers."2006IEEE/ION Position, Location, andNavigationSymposium.IEEE,2006. 187-197.Web. (Year: 2006).*
(Continued)

Primary Examiner — Ramya P Burgess
Assistant Examiner — Keith A von Volkenburg
(74) Attorney, Agent, or Firm — Harrity & Harrity, LLP

(57) ABSTRACT

A personal navigation device comprising a body, a star tracker, an inclinometer, a clock, a GNSS receiver, and first and second position calculation modules. The first position calculation module is configured to calculate latitude and longitude of the body based on respective outputs from the star tracker, inclinometer, and clock. The second position calculation module is configured to calculate latitude and longitude of the body based on satellite signals received by the GNSS receiver. In one implementation, the star tracker includes a short-wave infrared camera and the inclinometer includes three accelerometers having non-coplanar axes. The personal navigation device may further include a display device, a display engine, and a user interface configured to enable selection of a particular method of calculating latitude and longitude depending on whether GNSS is available or not.

21 Claims, 4 Drawing Sheets

(58) Field of Classification Search
USPC .................................................. 701/470, 513
See application file for complete search history.

(56) References Cited

U.S. PATENT DOCUMENTS

| | | | |
|---|---|---|---|
| 6,674,398 B2 | 1/2004 | Murphy | |
| 7,471,241 B1* | 12/2008 | Yang | G01S 5/021 |
| | | | 342/357.73 |
| 7,538,723 B2 | 5/2009 | Davis et al. | |
| 8,164,514 B1* | 4/2012 | Yang | G01S 5/0273 |
| | | | 342/357.28 |
| 8,763,442 B2 | 7/2014 | Peltz et al. | |
| 8,849,565 B1 | 9/2014 | Gutt | |
| 9,304,184 B1 | 4/2016 | Dragonov et al. | |
| 9,689,747 B1* | 6/2017 | Stone | G01J 5/10 |
| 9,784,582 B2 | 10/2017 | Georgy et al. | |
| 9,846,240 B2 | 12/2017 | Li et al. | |
| 10,647,449 B2 | 5/2020 | Wasson et al. | |
| 10,694,148 B1 | 6/2020 | Li et al. | |
| 10,782,134 B1 | 9/2020 | Biren et al. | |
| 10,993,121 B1 | 4/2021 | Li et al. | |
| 2009/0177398 A1* | 7/2009 | Belenkii | G01C 21/1656 |
| | | | 701/500 |
| 2011/0063167 A1 | 3/2011 | Gum et al. | |
| 2016/0214742 A1* | 7/2016 | Carroll | G01C 21/1656 |
| 2017/0269221 A1* | 9/2017 | Rautalin | G01S 19/40 |
| 2018/0011620 A1 | 1/2018 | Troy et al. | |
| 2020/0005097 A1* | 1/2020 | Sinclair | G01S 13/931 |
| 2020/0025942 A1 | 1/2020 | Kassas et al. | |
| 2020/0153535 A1* | 5/2020 | Jayaweera Kankanamge | |
| | | | G06V 10/82 |
| 2020/0256678 A1 | 8/2020 | Li et al. | |
| 2021/0033400 A1* | 2/2021 | Belenkii | G02B 23/04 |
| 2021/0048542 A1* | 2/2021 | Capuano | G01S 19/45 |

FOREIGN PATENT DOCUMENTS

| | | | |
|---|---|---|---|
| RU | 2592715 C1 * | 7/2016 | |
| WO | WO-2008045014 A2 * | 4/2008 | G01C 21/025 |
| WO | 2018106311 A2 | 6/2018 | |

OTHER PUBLICATIONS

Gao, Bingbing et al. "Multi-SensorOptimalDataFusionforINS/GNSS/CNSIntegrationBasedon UnscentedKalmanFilter." Internationaljournalofcontrol,automation,andsystems16.1(2018): 129-140.Web. (Year: 2018).*

Extended European Search Report (EESR) issued on Jun. 15, 2022, in European Patent Application No. 21201704.0 (European counterpart of the instant U.S. patent application).

Parish et al., "Positioning System (Part I): An Autonomous Position Determination Solution", Journal of Institute of Navigation, vol. 57, No. 1, Jun. 1, 2010, pp. 1-12.

* cited by examiner

PERSONAL NAVIGATION DEVICE OPERABLE IN GNSS-DENIED ENVIRONMENT

RELATED PATENT APPLICATION

This application claims the benefit, under Title 35, United States Code, Section 119 (e), of U.S. Provisional Application No. 63/120,659 filed on Dec. 2, 2020.

BACKGROUND

The present disclosure generally relates to personal navigation devices and, in particular relates to personal navigation devices which are capable to determine latitude and longitude without using signals from satellites.

Global navigation satellite systems (GNSS), such as the Global Positioning System (GPS), are widely used. However, GNSS signals are susceptible to external interference. Specifically, GPS and other GNSS signals are low in power, thereby making them susceptible to disruption by even very low-power interferences. For example, GPS denial may be caused by interference referred to as "jamming". As a result, other positioning, navigation and tracking (PNT) approaches such as vision-based navigation, celestial navigation, terrain-referenced navigation, signal-of-opportunity-based PNT, etc. may be used as an alternative or a supplemental solution when a GNSS system (e.g., GPS in the U.S.A.) is unavailable.

Celestial navigation uses the angular measurements of celestial bodies (e.g. stars, sun, moon, planets) to determine attitude, position, and time. Celestial navigation has been extensively used for marine navigation as well as the navigation of aircraft and missiles. When the GPS became fully operational and available as a low-cost, high-accuracy, and high-availability navigation method, celestial navigation was in low demand for some time. However, there has been a strong renewed interest in celestial navigation because GPS includes some drawbacks such as limited availability and vulnerability to jamming and spoofing.

An optical sensor-based approach has been the primary approach to determine spacecraft attitude. Early spacecraft used sun sensors and earth sensors for attitude determination. However, star tracker-based systems are now the approach of choice for most spacecraft due to the high accuracy and the availability of relatively low-cost star trackers. However, although celestial navigation offers the promise of a GPS-independent navigation solution for satellites, celestial navigation technology has not been employed in personal navigation devices.

SUMMARY

The subject matter disclosed in some detail below is directed to a personal navigation device that is capable to determine longitude and latitude while at rest (relative to the Earth's surface) without using GNSS (e.g., GPS) signals. Instead, the personal navigation device has the capability to determine latitude and longitude by measuring local vertical and attitude with respect to a coordinate frame such as ECI (Earth Centered Inertial) defined by celestial bodies, while stationary. More specifically, the personal navigation device is configured to measure both tilt with respect to the direction of the local gravitational force (hereinafter "local vertical measurement") and attitude with respect to celestial bodies (hereinafter "celestial navigation").

The term "navigation" is used herein in a broad sense to mean the determination (e.g., calculation) of the position (latitude and longitude) of the personal navigation device (which may be carried by a person, a vehicle, or a robot) while at rest. As used herein, the term "local vertical" means the direction of the force of gravity at the location of the personal navigation device, the direction of gravity being measured in the frame of reference of the body of the personal navigation device.

In accordance with some embodiments, the local vertical is measured using an inclinometer while a star tracker is used to perform celestial navigation. In accordance with one proposed implementation, the personal navigation device is configured to use a GNSS receiver to determine longitude and latitude if GNSS is available or use a camera capable of "seeing" stars (e.g., a short-wave infrared camera to enable day-time star-tracking capability) and three accelerometers to determine longitude and latitude if GNSS is unavailable. In the latter case, the collection of image and accelerometer data occurs while the personal navigation device is at rest.

Although various embodiments of a personal navigation device equipped with a star tracker and an inclinometer will be described in some detail below, one or more of those embodiments may be characterized by one or more of the following aspects.

One aspect of the subject matter disclosed in detail below is a personal navigation device comprising a body, a star tracker, an inclinometer, a clock, and a position calculation module configured to calculate latitude and longitude of the body based on respective outputs from the star tracker, inclinometer, and clock. All of these elements may be contained in a hand-held housing. The personal navigation device may further comprise an ECI-to-ECEF (Earth-centered inertial to Earth-centered, Earth-fixed frames of reference) transformation matrix calculation module (this is typically a software module) which is: (a) connected to receive a clock signal from the clock; (b) configured to calculate an ECI-to-ECEF transformation matrix based on the clock signal; and (c) connected to provide the ECI-to-ECEF transformation matrix to the position calculation module for use in calculating latitude and longitude.

In accordance with one proposed implementation of the personal navigation device described in the immediately preceding paragraph: (a) the star tracker comprises a camera and an attitude calculation module configured to calculate an attitude of the body in an ECI frame of reference based on images of celestial bodies captured by the camera; and (b) the inclinometer comprises first, second, and third accelerometers having non-coplanar axes in a frame of reference of the body and a local vertical calculation module configured to calculate a local vertical in a frame of reference of the body based on accelerometer data output by the first, second, and third accelerometers.

Another aspect of the subject matter disclosed in detail below is a navigation system comprising: a sensor head comprising a body, a camera (e.g., a short-wave infrared camera) mounted to the body, and first, second, and third accelerometers mounted to the body; a communication means for receiving image data from the camera and accelerometer data from the first, second, and third accelerometers; and a hand-held computing/display device connected to receive the image data and the accelerometer data via the communication means. The hand-held computing/display device comprises: a clock; an attitude calculation module configured to calculate an attitude of the body in an ECI frame of reference based on images of celestial bodies captured by the camera; a local vertical calculation module configured to calculate a local vertical in a frame of reference of the body based on accelerometer data output by the first, second, and third accelerometers; and a position calculation module (this module is typically a software module) configured to calculate latitude and longitude of the body based on respective outputs from the attitude calculation module, local vertical calculation module, and clock.

A further aspect of the subject matter disclosed in detail below is a method for determining a position of a body of a navigation device at rest relative to Earth, the method comprising: (a) capturing light emanating from a plurality of celestial bodies which appear in a field of view of a camera which is mounted to the body at rest; (b) calculating an attitude of the body in an ECI frame of reference based on images of the celestial bodies captured by the camera; (c) measuring accelerations of the navigation device due to Earth's gravity using accelerometers which are mounted to the body with axes that are non-coplanar; (d) calculating a celestial navigation solution that includes a local vertical in a frame of reference of the body based on the measured accelerations; (e) calculating an ECI-to-ECEF transformation matrix based on clock signals output by a clock; and (f) calculating latitude and longitude of the body based on the calculated attitude, calculated local vertical, and ECI-to-ECEF transformation matrix.

Yet another aspect of the subject matter disclosed in detail below is a personal navigation device comprising: a body; a star tracker; an inclinometer; a clock; a first position calculation module configured to calculate latitude and longitude of the body based on respective outputs from the star tracker, inclinometer, and clock; a GNSS receiver; and a second position calculation module configured to calculate latitude and longitude of the body based on satellite signals received by the GNSS receiver. In accordance with one embodiment, the personal navigation device further comprises: a display device; a display engine configured to present symbology indicating latitude and longitude of the personal navigation device on the display device; and a user interface configured to enable selection of latitude and longitude calculated by either the first position calculation module when the personal navigation device is positioned in a GNSS-denied environment or the second position calculation module when the personal navigation device is positioned in an environment wherein GNSS is available.

Other aspects of personal navigation devices equipped with a star tracker and an inclinometer are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of a personal navigation device equipped with a star tracker and an inclinometer are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
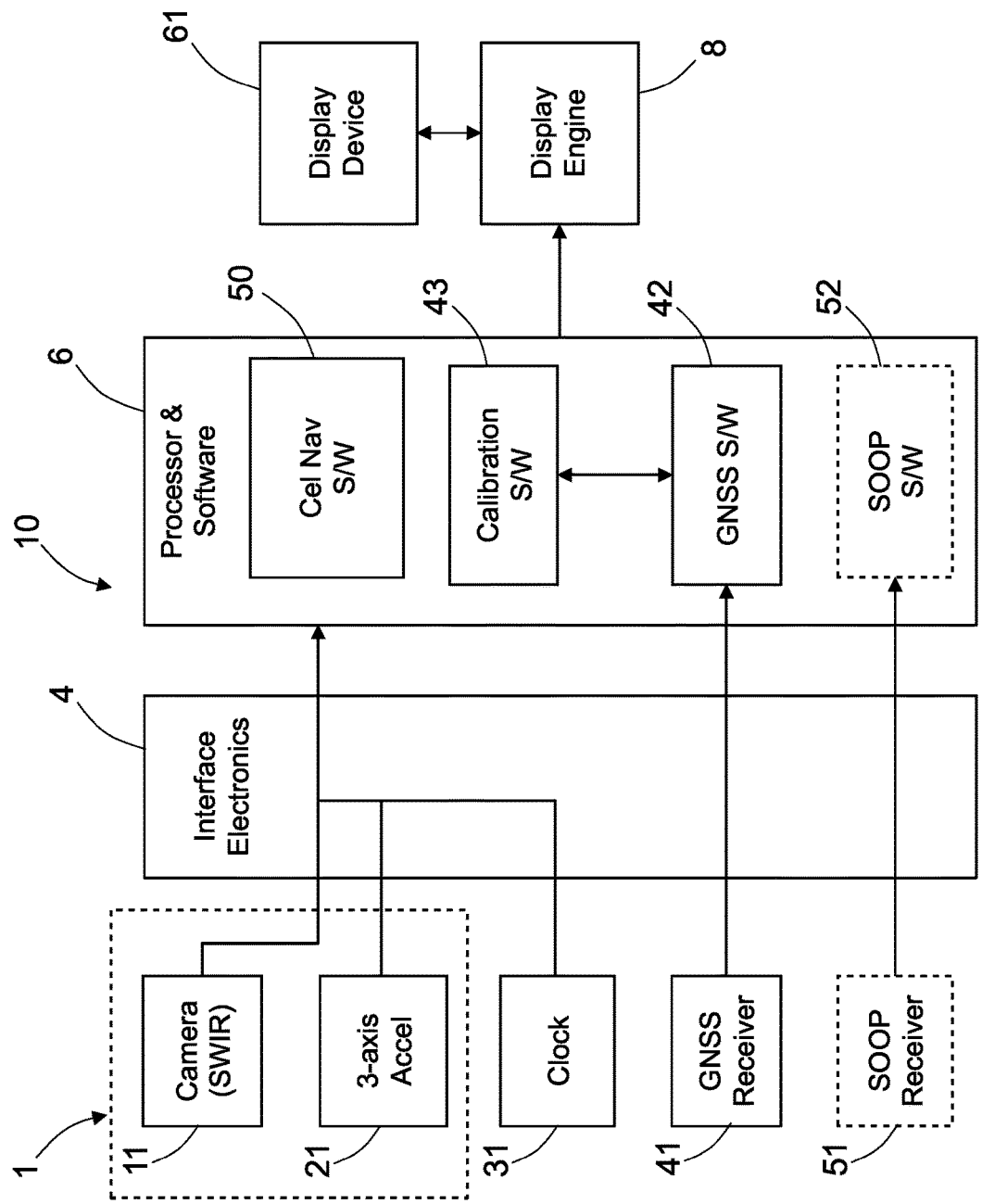
FIG. 1 is a block diagram identifying components of a personal navigation device equipped with a short-wave infrared (SWIR) camera and a plurality of accelerometers which acquire image data and accelerometer data respectively, which data is used to determine latitude and longitude of the personal navigation device.

FIG. 1 is a block diagram identifying components of a personal navigation device 10 (hereinafter "PND 10") in accordance with one embodiment. The PND 10 includes a plurality of sensors 1, a clock 31, and a computer 6. As used herein, the term "computer" includes hardware (e.g., a processor) and software (e.g., software modules consisting of executable code representing algorithms for processing data). The computer 6 receives data signals from the sensors 1 and clock signals from clock 31 via interface electronics 4.

The sensors 1 include a short-wave infrared (SWIR) camera 11 (hereinafter "SWIR camera 11") and three (or more) accelerometers 21. The SWIR camera 11 acquires image data while stars are in the field of view of the camera. The accelerometers 21 measure three-axis acceleration of PND 10 due to Earth's gravity. The accelerometers 21 are affixed to the body of PND 10 with axes that are non-coplanar. In one proposed implementation, the accelerometer axes are mutually orthogonal and define the coordinate system (frame of reference) of the body of PND 10. In one proposed implementation, QA-2000 single-axis quartz accelerometers, commercially available from Honeywell International Inc. (Morristown, NJ), are used.

The computer 6 includes celestial navigation software 50. The celestial navigation software 50 is configured to determine latitude and longitude of PND 10 based on image and accelerometer data respectively acquired by SWIR camera 11 and accelerometers 21 while at rest. As will be described in some detail below with reference to FIG. 2, the celestial navigation software 50 includes an image data processing path (star tracker 3 in FIG. 2) and an accelerometer data processing path (inclinometer 5 in FIG. 2). Each processing path comprises a series of software modules in the form of algorithms described in some detail below.

Referring again to FIG. 1, the PND 10 further includes a display device 61 and a display engine 8 which is configured to control the display device 61 to present symbology indicating latitude and longitude of PND 10 (as calculated by computer 6). In accordance with some embodiments, the sensors 1, computer 6, and display device 61 are integrated within a housing (not shown in FIG. 1) of PND 10 that is configured to be held by a human hand. Optionally, the PND 10 may be equipped with a mini-tripod which is attached to the exterior of the housing, which enables static placement of the PND 10 relative to the Earth's surface. The electronic components may be integrated with or mounted to a printed circuit board (PCB) seated inside the housing. In this case, the substrate of the PCB may be considered the "body" of PND 10 while the axes of the accelerometers 21 mounted to the PCB define the frame of reference of that body.

Optionally, the embodiment depicted in FIG. 1 may include one or more gyroscopes. However, the cost and size, weight, and power (SWAP) of PND 10 may be reduced by omitting gyroscopes when the goal is to create the least expensive and low-SWAP realization of celestial navigation capability.

The capabilities of the PND 10 can be expanded to include GNSS navigation, signals-of-opportunity (SOOP) PNT, secured 5 G communication, and threat geolocation for use in electronic warfare. FIG. 1 depicts an embodiment that includes a GNSS receiver 41 and GNNS navigation software 42 configured to calculate latitude and longitude of the body of PND 10 based on satellite signals received by the GNSS receiver 41. The PND 10 may further include calibration software 43 which is configured so that when GNSS is available and the device is placed statically, the difference between the GNSS-based solution and the celestial navigation solution may be used to calibrate the error parameters of the celestial/accelerometer-based solutions. The PND 10 may further include a SOOP receiver 51 and SOOP navigation software 52 configured to calculate latitude and longitude of the body based on signals received by the SOOP receiver 51 from a SOOP source. It is possible to connect GNSS receiver 41 and SOOP receiver 51 to a single broad-band antenna. In the alternative, multiple antennas can be used for multiple bands of interest. Each antenna will be a small patch antenna.

Figure 2:
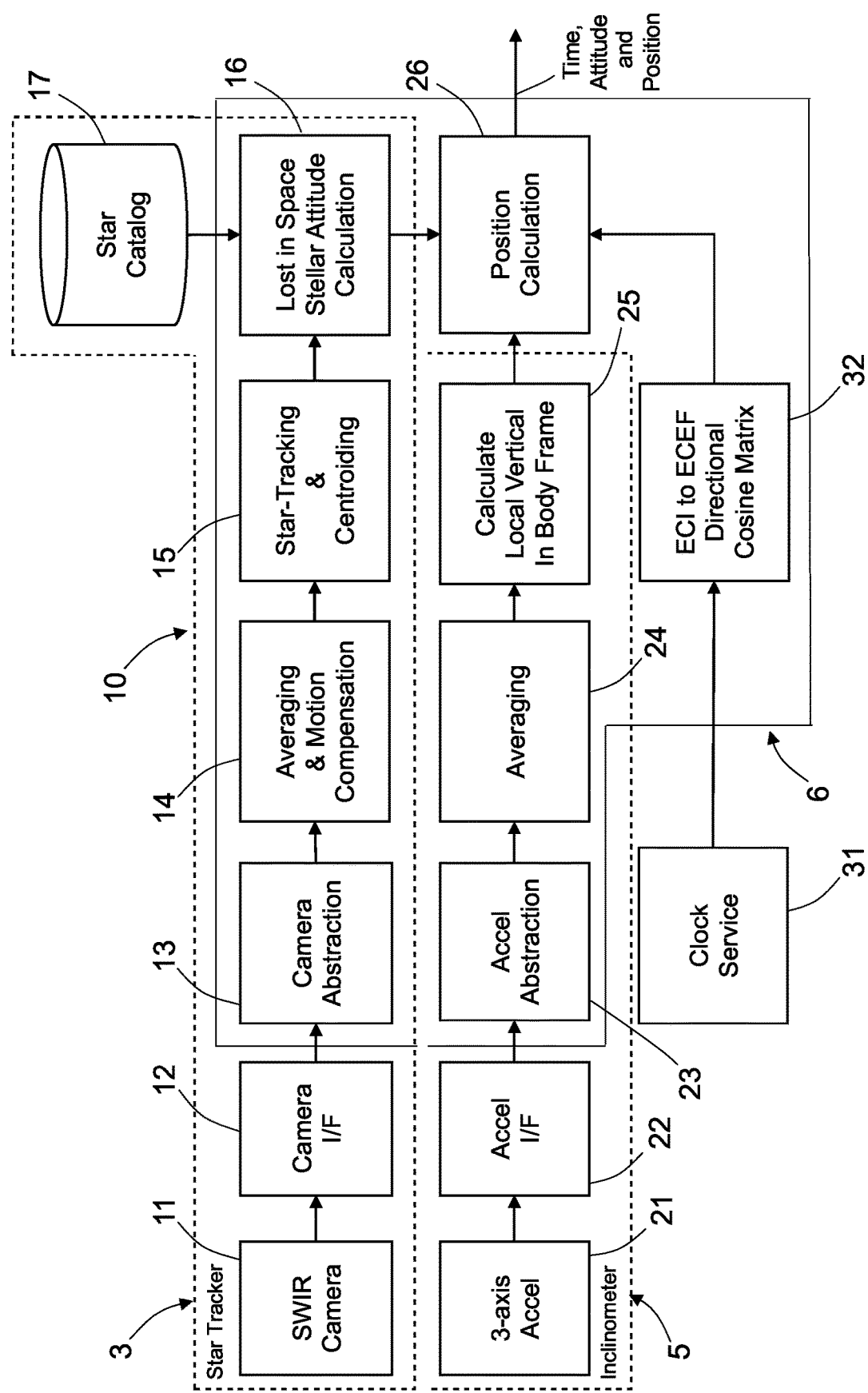
FIG. 2 is a block diagram identifying components of a personal navigation device that includes a star tracker, an inclinometer, a clock, and a position calculation module configured to calculate latitude and longitude based on information from the star tracker, inclinometer, and clock.

FIG. 2 is a block diagram identifying components of a PND 10 in accordance with one proposed implementation. The PND 10 depicted in FIG. 1 includes a star tracker 3 configured to calculate attitude relative to the stars, an inclinometer 5 configured to calculate the local vertical, a clock 31, an ECI-to-ECEF transformation matrix calculation module 32 connected to receive clock signals from the clock 31, and a position calculation module 26 configured to determine latitude and longitude based on the attitude, local vertical, and ECI-to-ECEF transformation matrix.

The star tracker 3 includes a SWIR camera 11, a camera interface 12, a star catalog 17, and an image data processing path consisting of various software modules incorporated in a computer 6. These software modules include computer code which implements the image data processing algorithms described hereinafter. By matching star patterns in images captured by the SWIR camera 11 against the star catalog 17, the computer 6 can determine the attitude of the body of PND 10 in the ECI frame of reference.

The SWIR camera 11 may be based on charge-coupled device (CCD) or complementary metal-oxide semiconductor (CMOS) technology, similar to most digital cameras and cameras incorporated in cell phones. The image data captured by SWIR camera 11 is input to the camera interface 12. The camera interface 12 is the hardware and software which allows the image data generated by the SWIR camera 11 to be transferred to the computer 6.

The star tracker 3 further includes a camera abstraction module 13, which is software that transforms the specifics of the camera into a generic camera in terms of the data format and contents. The purpose of this module is to shield of the rest of the software on the right-hand side of the image data processing path from changes even if a different type of camera is used The star tracker 3 also includes an averaging and motion compensation module 14 which is configured to average the output of the camera over time to reduce the impact of noise. Other camera corrections may also be applied at this stage. The averaged and motion-compensated image data is then processed by a star tracking and centroiding module 15. The star tracking and centroiding module 15 performs image processing to identify clusters of bright pixels, track their consistency over multiple camera frames, and then decide if the pixel clusters should be treated as a "candidate star" or not. If a determination is made that a pixel cluster represents a star, centroiding processing is used to determine the "position" of the candidate star in the camera field of view. The centroiding algorithm is as simple as computing the weighted average of the positions of each bright pixel in the cluster. In addition, the total energy of the pixel cluster will be calculated to determine the magnitude of (intensity of light from) the star.

The star tracker 3 further includes a "Lost-in-space" stellar attitude calculation module 16 which receives the output from the star tracking and centroiding module 15. The "Lost-in-space" stellar attitude calculation module 16 is configured to search the star catalog 17 for a known star pattern that matches the star pattern represented by the processed image data provided by the star tracking and centroiding module 15. ("Lost-in-space stellar attitude acquisition using multiple star trackers is described in U.S. Pat. No. 6,470,270 B1.) The result is that the computer 6 is able to determine the attitude of the body frame of reference (hereinafter "body frame") with respect to the ECI frame of reference (hereinafter "ECI frame") represented as a quaternion q_b_eci or a directional cosine matrix C_b_eci, which may be used to transform a vector from the ECI frame to the body frame or vice versa. The calculated attitude is provided to the position calculation module 26. The star catalog 17 is stored in a non-transitory tangible computer-readable storage medium separate from the computer 6.

The inclinometer 5 includes accelerometers 21, an accelerometer interface 22, and an accelerometer data processing path consisting of various software modules incorporated in the computer 6. The accelerometer data processing path includes computer code which implements the accelerometer data processing algorithms described hereinafter The accelerometer data processing path is configured to determine the direction of the local vertical in the body frame of reference.

The accelerometers 21 having respective axes which are aligned with known directions in the body frame of reference of PND 10. Without loss of generality, one can assume that the three accelerometers 21 are installed along the three axes of the body frame (when it is not, mathematical transformations can be used to create the equivalent measurements). The accelerometer data acquired by accelerometers 21 is input to the accelerometer interface 22. The accelerometer interface 22 is the hardware and software which allows accelerometer outputs to be transferred to the computer 6.

The inclinometer 5 further includes an accelerometer abstraction module 23, which is software that transforms the specifics of the accelerometer into a generic accelerometer in terms of the data format and contents. The purpose of this module is to shield the rest of the software on the right-hand side of the accelerometer data processing path from changes even if a different type of accelerometer is used The inclinometer 5 also includes an averaging module 24 which is configured to average the output of the accelerometers 21 over time to reduce the impact of noise. Other accelerometer corrections can be applied at this stage, such as bias correction, scale factor correction, and misalignment corrections estimated during factory calibration. The averaged accelerometer data is then processed by a local vertical calculation module 25. The local vertical calculation module 25 is configured to calculate a local vertical in the frame of reference of the body based on the accelerometer data output by accelerometers 21. The calculated local vertical is provided to the position calculation module 26.

In accordance with the embodiment depicted in FIG. 2, the PND 10 further includes a clock 31 that outputs clock signals representing the absolute time and an ECI-to-ECEF transformation (directional cosine) matrix calculation module 32 which receives the clock signals from clock 31. The ECI-to-ECEF transformation matrix calculation module 32 uses the time to calculate a transformation between the ECEF frame and the ECI frame using widely available equations (for example, see the undated Appendix entitled "Transformation of ECI (CIS, EPOCH 52000.0) Coordinates to WGS 84 (CTS, ECEF) Coordinates"). The calculated ECI-to-ECEF transformation matrix is provided to the position calculation module 26.

As previously noted, the computer 6 further includes a position calculation module 26 which is configured to calculate the current position of PND 10 in terms of latitude and longitude using the results from modules 16, 25, and 32. In accordance with one proposed implementation, the local vertical calculation module 25 calculates the local gravity direction in the body frame of reference using the following equation:

$$m^B u_g = \frac{1}{\|{}^B g\|} {}^B g = \frac{-1}{\|m^B f\|} m^B f \quad (1)$$

where u is the unit vector and g is the total gravity vector. The total gravity vector g is calculated from the measured specific source f when there is no motion. The left superscript "B" indicates that the vector is expressed in the body frame of reference.

Thereafter, the position calculation module 26 calculates the local gravity direction in the North-East-Down (NDE) frame of reference from the attitude knowledge:

$$
{}^B u_g = \\
C^B_{NED} \begin{bmatrix} 0 \\ 0 \\ 1 \end{bmatrix} = C^B_{ECI} C^{ECI}_{ECEF} C^{ECEF}_{NED} \begin{bmatrix} 0 \\ 0 \\ 1 \end{bmatrix} = C^B_{ECI} C^{ECI}_{ECEF} \begin{bmatrix} -\cos(lat)\cos(lon) \\ -\cos(lat)\sin(lon) \\ -\sin(lat) \end{bmatrix} \quad (2)
$$

where $C_{ECI}{}^B$ (or $C_B{}^{ECI}=(C_{ECI}{}^B)^T$) is a transformation matrix that transforms a vector from the ECI frame to the body frame. The transformation matrix $C_B{}^{ECI}$ is calculated by the "Lost-in-space" stellar attitude calculation module 16. In addition, $C_{ECEF}{}^{ECI}$ (or $C_{ECI}{}^{ECEF}=(C_{ECEF}{}^{ECI})^T$) is a transformation matrix that transforms a vector from the ECEF frame to the ECI frame. The transformation matrix $C_{ECI}{}^{ECEF}$ is a function of time only and is calculated by the ECI-to-ECEF transformation matrix calculation module 32. The transformation matrix $C_{NED}{}^{ECEF}$ is a transformation matrix that transforms a vector from the NED frame to the ECEF frame.

Equating Eqs. (1) and (2) results in the following equation:

$$\begin{bmatrix} -\cos(lat)\cos(lon) \\ -\cos(lat)\sin(lon) \\ -\sin(lat) \end{bmatrix} = C^{ECEF}_{ECI} C^{ECI}_B m {}^B u_g = m^{ECEF} u_g \quad (3)$$

The position calculation module 26 then calculates the position of PND 10 as follows:

$$lat = \sin^{-1}\left(-m^{ECEF} u_g(3)\right)$$

$$lon = \tan^{-1}\left(\frac{-m^{ECEF} u_g(2)}{-m^{ECEF} u_g(1)}\right)$$

Figure 3:
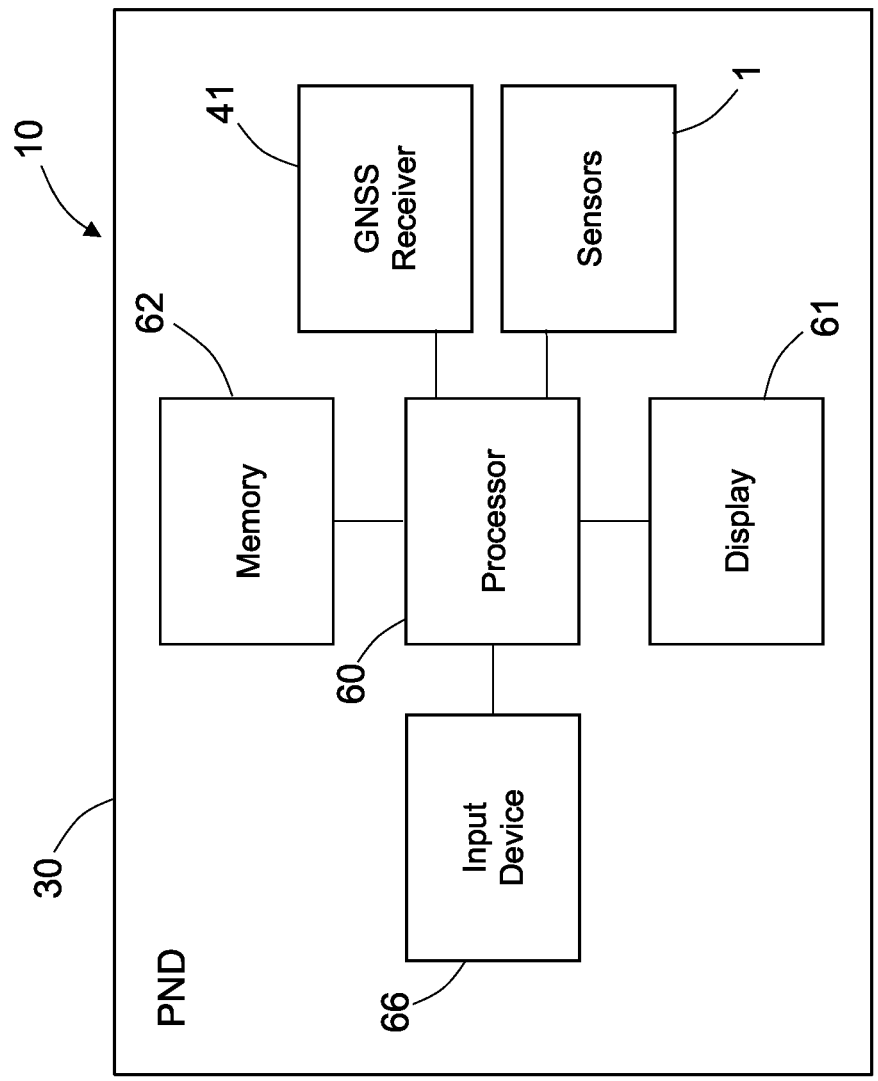
FIG. 3 is a block diagram identifying hardware components of a hand-held personal navigation device capable of measuring a local vertical and an attitude with respect to celestial bodies in accordance with some embodiments.

FIG. 3 is a block diagram identifying hardware components of a PND 10 having a housing 30 designed to be held in a human hand. The PND 10 depicted in FIG. 3 may be configured with software modules that measure a local vertical with respect to the PND body and software modules that measure an attitude of the PND body relative to celestial bodies as described above with reference to FIG. 2. The PND 10 includes at least the following hardware components: a processor 60, a display device 61, a memory 62 (in the form of a non-transitory tangible computer-readable storage medium), an input device 66, sensors 1, and a GNSS receiver 41.

The processor 60 is generally any piece of computer hardware that is capable of executing computer programs that process data. The processor 60 may comprise electronic circuits, some of which may be packaged as an integrated circuit (e.g., a chip) or multiple interconnected integrated circuits. The processor 60 may be configured to execute computer programs, which may be stored onboard the processor or otherwise stored in a memory 62 as computer-readable program code. In alternative embodiments, the processor 60 may be embodied as or otherwise include one or more application-specific integrated circuits, field-programmable gate arrays or the like.

The memory 62 is generally any piece of computer hardware that is capable of storing digital data and computer programs (e.g., computer-readable program code, a star catalog, and transformation matrices). The memory 62 may include volatile and non-volatile memory, and may be fixed or removable. Examples of suitable memory include random access memory, read-only memory, and a thumb drive.

The PND 10 further includes one or more input devices 66. The input device 66 may be wired or wireless, and may be configured to receive information from a user into the apparatus, such as for processing, storage and/or display. Examples of suitable user input devices include a mouse, microphone, image or video capture device, keyboard or keypad, joystick, touch-sensitive surface (separate from or integrated into a touchscreen), biometric sensor or the like.

The processor 60 is also connected to a display device 61. The display engine 8 (identified in FIG. 1) is configured to render for display on the display device 61 symbology indicating the latitude and longitude calculated by the position calculation module 26. For example, the symbology may include points on a map representing a portion of the Earth's surface. The display device 61 may be configured to present or otherwise display information to a user. Suitable examples include a liquid crystal display, light-emitting diode display, plasma display panel or the like.

The PND 10 depicted in FIG. 3 further includes sensors 1 (including SWIR camera 11 and accelerometers 21 as previously described) and a GNSS receiver 41. The processor 60 may operate in either of two modes: as a first position calculation module configured to calculate latitude and longitude of the body based on respective local vertical and attitude outputs from the sensors 1 or as a second position calculation module configured to calculate latitude and longitude of the body based on satellite signals received by the GNSS receiver 41. The input device 66 is configured to enable selection of the operational mode of processor 60. More specifically, the device user may choose to use either GNSS (when PND 10 is positioned in an environment wherein GNSS is available) or celestial navigation (when PND 10 is positioned in an environment wherein GNSS is not available) to determine latitude and longitude.

Figure 4:
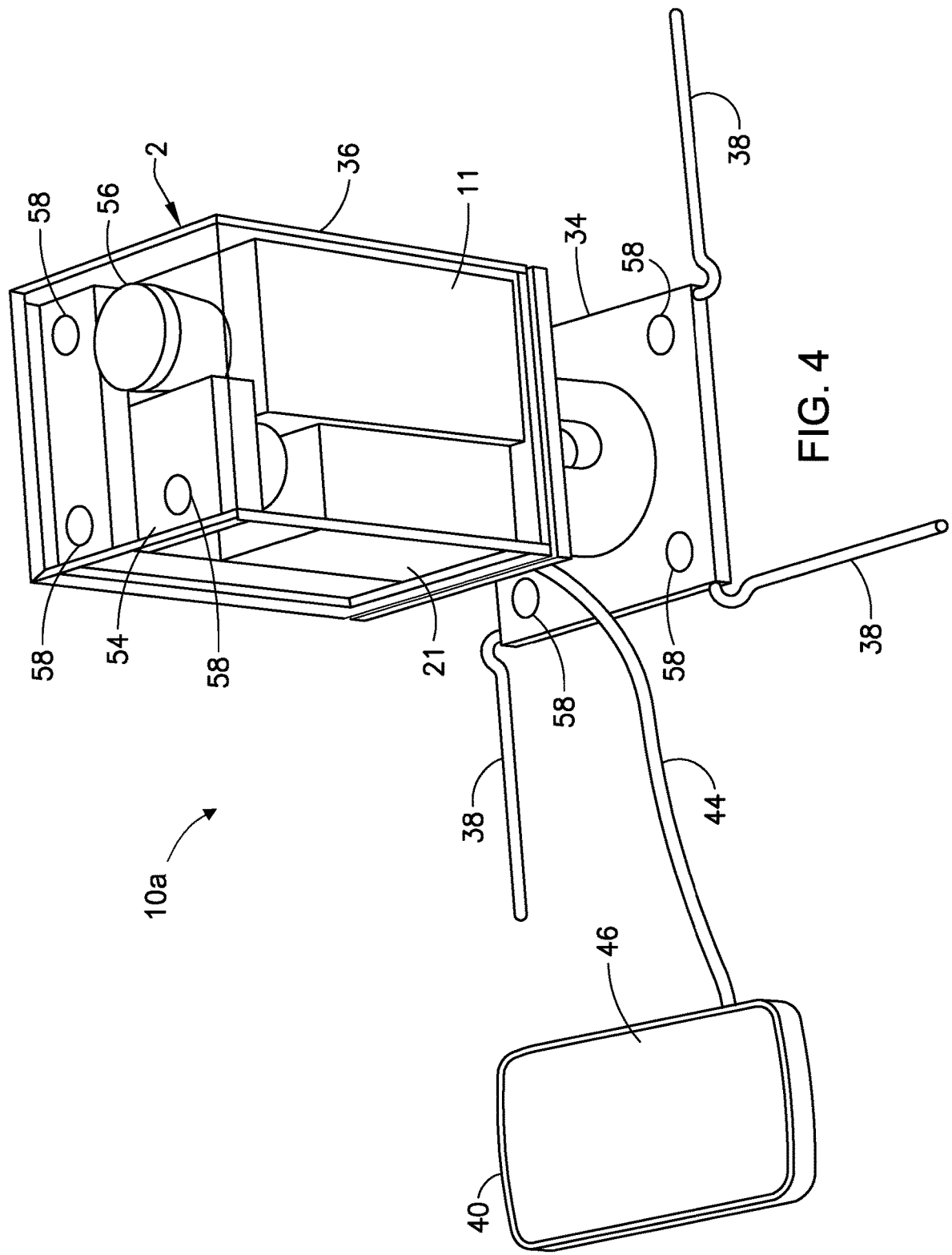
FIG. 4 is a diagram representing a three-dimensional view of a personal navigation device consisting of a sensor head communicatively coupled to a mobile device (such as a cell phone) via a cable in accordance with an alternative embodiment.

FIG. 4 is a diagram representing a three-dimensional view of a personal navigation device 10*a* (hereinafter "PND 10*a*") consisting of a sensor head 2 communicatively coupled to a hand-held computing/display device 40 (such as a cell phone or personal data assistant) via a cable 44 in accordance with an alternative embodiment. The hand-held computing/display device 40 includes a display screen 46 for visually annunciating the calculated latitude and longitude to the user. The hand-held computing/display device 40 may also include other security features such as anti-tampering, encryption, code protection, etc. In addition, the hand-held computing/display device 40 may include a wideband multi-channel software-defined radio. Such a design produces a radio which can receive and transmit widely different radio protocols (sometimes referred to as waveforms) based solely on the software used.

The sensor head 2 includes a platform 34 and a sensor head body 36 that is affixed to the platform 34. The PND 10*a* further includes a plurality of legs 38 coupled to platform 34, which legs allow the sensor head 2 to be placed at rest in a stable manner. The legs 38 can be similar in size to a cell phone holder. The sensor head 2 further includes a SWIR camera 11 having a lens 56, a set of three accelerometers 21 having non-coplanar axes, and a gyroscope 54, all of which sensors are mounted to the body 36. The PND 10*a* further includes a phased-array antenna mounted to the sensor head 2. The phased-array antenna depicted in FIG. 4 is in the form of multiple small patch antennas 58. By combining outputs from these antennas in certain ways, the hand-held computing/display device 40 can reduce gain in the direction of jamming to provide anti-jamming capability.

The hand-held computing/display device 40 is communicatively coupled by cable 44 to receive image data from the SWIR camera 11, accelerometer data from accelerometers 21, and gyroscopic data from gyroscope 54. The hand-held computing/display device 40 further includes a clock module, an attitude calculation module, a local vertical calculation module, and a position calculation module (modules not shown in FIG. 4) configured to calculate latitude and longitude of the body based on respective outputs from the attitude calculation module, local vertical calculation module, and clock module.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While personal navigation devices equipped with a star tracker and an inclinometer have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The "computer" disclosed above may include one or more processing or computing devices. Such devices typically include a processor or controller, such as a general-purpose central processing unit, a microcontroller, a reduced instruction set computer processor, an application-specific integrated circuit, a programmable logic circuit, a field-programmable gate array, a digital signal processor, and/or any other data processing circuitry capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein.

In the method claims appended hereto, the alphabetic ordering of steps is for the sole purpose of enabling subsequent short-hand references to antecedent steps and not for the purpose of limiting the scope of the claim to require that the method steps be performed in alphabetic order.

The structures which perform the function of the "communication means" recited in the appended claims include a cable (wired connection), a wireless connection (e.g., a transmitter and a receiver within communication range), and structural equivalents thereof.

The invention claimed is:

1. A personal navigation device comprising:
   a body;
   a star tracker device,
      wherein the star tracker comprises a short-wave infrared camera that is configured to capture images of celestial bodies;
   a plurality of small patch antennas that provide anti-jamming capabilities by combining outputs from the plurality of small patch antennas;
   an inclinometer,
      wherein the inclinometer comprises a first accelerometer, a second accelerometer, and a third accelerometer;
   a clock; and
   a first position calculation module configured to calculate latitude and longitude of the body based on respective outputs from the star tracker, the inclinometer, and the clock when in a first environment where global navigation satellite system (GNSS) is denied,
      wherein image data of the captured images of the celestial bodies is averaged over a first period of time,
      wherein accelerometer data from the first, the second, and the third accelerometers is averaged over a second period of time, and wherein navigation information is provided based on output of the first position calculation module;
a second position calculation module configured to calculate the latitude and longitude of the body based on satellite signals received by a GNSS receiver when in a second environment where GNSS is available; and
a display device configured to render for display symbology indicating the calculated latitude and longitude of the body, wherein the symbology includes points on a map.

2. The personal navigation device as recited in claim 1, further comprising an Earth-Centered Intertial to Earth-centered Earth-fixed frames of reference (ECI-to-ECEF) transformation matrix calculation module connected to receive a clock signal from the clock, configured to calculate an ECI-to-ECEF transformation matrix based on the clock signal, and connected to provide the ECI-to-ECEF transformation matrix to the first position calculation module for use in calculating latitude and longitude.

3. The personal navigation device as recited in claim 1, wherein the star tracker further comprises an attitude calculation module configured to calculate an attitude of the body in an Earth-Centered Intertial (ECI) frame of reference based on the image data.

4. The personal navigation device as recited in claim 1, wherein the first, the second, and the third accelerometers have nonplanar axes which can be transformed to 3 mutually orthogonal axes in a frame of reference of the body.

5. The personal navigation device as recited in claim 4, wherein the inclinometer further comprises a local vertical calculation module configured to calculate a local vertical in a frame of reference of the body based on accelerometer data output by the first, second, and third accelerometers.

6. The personal navigation device as recited in claim 1, further comprising a housing that contains the body, star tracker, inclinometer, clock, and position calculation module.

7. The personal navigation device as recited in claim 6, further comprising a GNSS receiver and GNNS navigation software configured to calculate latitude and longitude of the body based on satellite signals received by the GNSS receiver.

8. The personal navigation device as recited in claim 6, further comprising a signals-of-opportunity (SOOP) receiver and SOOP navigation software configured to calculate latitude and longitude of the body based on signals received by the SOOP receiver from a SOOP source.

9. The personal navigation device as recited in claim 8, wherein the SOOP receiver comprises a software-defined radio.

10. The personal navigation device of claim 1,
wherein when GNSS information is available, a difference between a first output of the first position calculation module and a second output of the second position calculation module is used to calibrate error parameters, and
wherein the navigation information is provided based on the calibration of the error parameters.

11. The personal navigation device of claim 1, wherein gain is reduced in a direction of jamming to provide the anti-jamming capability.

12. A navigation system comprising:
a sensor head comprising a body, a camera mounted to the body, and first, second, and third accelerometers mounted to the body, and a plurality of small patch antennas,
wherein the camera is a short-wave infrared camera that is configured to capture images of celestial bodies, and
wherein the plurality of small patch antennas provide anti-jamming capabilities by combining outputs from the plurality of small patch antennas;
communication module coupled to receive image data of the images of celestial bodies from the camera and accelerometer data from the first, second, and third accelerometers; and
a hand-held computing/display device connected to receive the image data and the accelerometer data via the communication means, the hand-held computing/display device comprising:
a clock;
an attitude calculation module configured to calculate an attitude of the body in an Earth-Centered Inertial (ECI) frame of reference based on the image data,
wherein the image data is averaged over a first period of time, and
wherein the accelerometer data is averaged over a second period of time;
a local vertical calculation module configured to calculate a local vertical in a frame of reference of the body based on accelerometer data output by the first, second, and third accelerometers; and
a first position calculation module configured to calculate latitude and longitude of the body based on respective outputs from the attitude calculation module, local vertical calculation module, and the clock when in a first environment where global navigation satellite system (GNSS) is denied,
wherein navigation information is provided based on output of the first position calculation module; and
a second position calculation module configured to calculate the latitude and the longitude of the body based on satellite signals received by a GNSS receiver when in a second environment where GNSS is available.

13. The navigation system as recited in claim 12, wherein the first, second, and third accelerometers have non-coplanar axes.

14. The navigation system as recited in claim 12, wherein the hand-held computing/display device further comprises an Earth-Centered Intertial to Earth-centered Earth-fixed frames of reference (ECI-to-ECEF) transformation matrix calculation module which is:
connected to receive a clock signal from the clock;
configured to calculate an ECI-to-ECEF transformation matrix based on the clock signal; and
connected to provide the ECI-to-ECEF transformation matrix to the position calculation module for use in calculating latitude and longitude.

15. The navigation system of claim 12, wherein when GNSS information is available, a difference between a first output of the first position calculation module and a second output of the second position calculation module is used to calibrate error parameters, and
wherein the navigation information is provided based on the calibration of the error parameters.

16. A method for determining a position of a body of a navigation device at rest relative to Earth, the method comprising:
capturing, via a star tracker device that includes a camera mounted to the body of the navigation device, light emanating from a plurality of celestial bodies, wherein the camera is a short-wave infrared camera that is configured to capture images of celestial bodies, and wherein image data, of the images of celestial bodies, is averaged over a first period of time;

calculating an attitude of the body in an Earth-Centered Inertial (ECI) frame of reference based on the image data;

measuring accelerations of the navigation device due to Earth's gravity using accelerometers which are mounted to the body with non-coplanar axes, wherein accelerometer data from the accelerometers is averaged over a second period of time to reduce impact of noise in the accelerometer data;

calculating a local vertical in a frame of reference of the body based on the measured accelerations;

calculating an Earth-Centered Intertial to Earth-centered Earth-fixed frames of reference (ECI-to-ECEF) transformation matrix based on clock signals output by a clock;

calculating, using a first position calculation module, a celestial navigation solution that includes latitude and longitude of the body based on the calculated attitude, calculated local vertical, and ECI-to-ECEF transformation matrix, when in a first environment where global navigation satellite system (GNSS) is denied;

calculating, using a second position calculation module, a GNSS-based solution that includes the latitude and longitude of the body based on satellite signals received by a GNSS receiver when in a second environment where GNSS is available;

providing anti-jamming capabilities by combining outputs from a plurality of small patch antennas associated with the navigation device; and displaying symbology indicating the calculated latitude longitude of the body, on a display device configured to render for, wherein the symbology includes points on a map.

17. The method as recited in claim 16, further comprising displaying symbology indicating the latitude and longitude.

18. The method as recited in claim 16, wherein a difference between a GNSS-based solution and the celestial navigation solution may be used to calibrate error parameters.

19. A personal navigation device comprising:

a body;

a star tracker,
wherein the star tracker comprises a short-wave infrared camera that is configured to capture images of celestial bodies, and
wherein image data of the captured images of the celestial bodies is averaged over a first period of time;

a plurality of small patch antennas that provide anti-jamming capabilities by combining outputs from the plurality of small patch antennas;

an inclinometer,
wherein the inclinometer comprises a first, a second, and a third accelerometer, and
wherein accelerometer data from the first, the second, and the third accelerometers is averaged over a second period of time;

a clock;

a first position calculation module configured to calculate latitude and longitude of the body based on respective outputs from the star tracker, inclinometer, and the clock;

a global navigation satellite system (GNSS) receiver; and a second position calculation module configured to calculate latitude and longitude of the body based on satellite signals received by the GNSS receiver,
wherein error parameters are calibrated based on a difference between a first output of the first position calculation module and a second output of the second position calculation module, and
wherein navigation information is provided based on the calibration.

20. The personal navigation device as recited in claim 19, wherein the star tracker comprises a camera and the inclinometer comprises first, second, and third accelerometers having non-coplanar axes in a frame of reference of the body.

21. The personal navigation device as recited in claim 19, further comprising:

a display device; and a display engine configured to present symbology indicating latitude and longitude of the personal navigation device on the display device.

* * * * *